United States Patent
Priller et al.

(10) Patent No.: US 11,720,722 B2
(45) Date of Patent: Aug. 8, 2023

(54) SIGNAL FLOW-BASED COMPUTER PROGRAM WITH DIRECT FEEDTHROUGH LOOPS

(71) Applicant: AVL LIST GMBH, Graz (AT)

(72) Inventors: Peter Priller, Gratwein-Straßengel (AT); Florian Pölzlbauer, Graz (AT)

(73) Assignee: AVL LIST GMBH, Graz (AT)

( * ) Notice: Subject to any disclaimer, the term of this patent is extended or adjusted under 35 U.S.C. 154(b) by 898 days.

(21) Appl. No.: 16/321,705

(22) PCT Filed: Jul. 31, 2017

(86) PCT No.: PCT/EP2017/069322
§ 371 (c)(1),
(2) Date: Aug. 13, 2020

(87) PCT Pub. No.: WO2018/020051
PCT Pub. Date: Feb. 1, 2018

(65) Prior Publication Data
US 2020/0380182 A1    Dec. 3, 2020

(30) Foreign Application Priority Data

Jul. 29, 2016    (AT) ................ A 50693/2016

(51) Int. Cl.
*G06F 30/20*    (2020.01)
*B60W 50/04*    (2006.01)

(52) U.S. Cl.
CPC ............ *G06F 30/20* (2020.01); *B60W 50/04* (2013.01)

(58) Field of Classification Search
CPC ............................... G06F 30/20; B60W 50/04
See application file for complete search history.

(56) References Cited

U.S. PATENT DOCUMENTS

| 8,849,641 | B1 | 9/2014 | Babaali |
| 10,318,653 | B1 * | 6/2019 | Khoo .................. G06F 11/3668 |

(Continued)

FOREIGN PATENT DOCUMENTS

| JP | 2006201988 A | 8/2006 |
| JP | 2011081539 A | 4/2011 |
| WO | 2010068786 A2 | 6/2010 |

OTHER PUBLICATIONS

Japanese Office Action; Application No. 2019-504848; dated Mar. 23, 2021; 5 Pages.

(Continued)

*Primary Examiner* — Chuen-Meei Gan
(74) *Attorney, Agent, or Firm* — Husch Blackwell LLP

(57) ABSTRACT

A method for controlling the course of a signal flow-based computer program having interconnected software components and at least one DF loop. The following method steps are performed: a) identifying the at least one DF loop and the DF components, each DF component instantaneously imaging at least one DF input signal present at at least one component input onto at least one output signal present at at least one component output, b) determining the maximum possible change of the values of the DF input signals for each unit of time from at least one property of the respective DF input signal, c) activating a delay element in front of the component input where a DF input signal is present whose value has the smallest maximum possible change, and d) running the computer program in accordance with the connection of the software components ascertained in steps a) to c).

13 Claims, 3 Drawing Sheets

(56) References Cited

U.S. PATENT DOCUMENTS

2005/0060129 A1* 3/2005 Mosterman ............. G06F 17/10
703/2
2006/0184597 A1 8/2006 Yamashita et al.
2011/0083125 A1 4/2011 Komatsu et al.

OTHER PUBLICATIONS

Anonymous. "Algebraic Loops—MATLAB & Simulink—MathWorks Deutschland", Jul. 1, 2016, Seiten 1-16, retrieved on Nov. 19, 2017, XP055424845 URL:https://web.archive.org/web/20160701112004/http://de.mathworks.com/help/simulink/ug/algebraic-loops.html.
Austrian Office Action Application No. A50693/2016-1 Completed: Jun. 30, 2017 4 Pages.
D.B. Johnson: "Finding all the Elementary Circuits of a Directed Graph", Siam J. Comput, vol. 4, No. 1, Mar. 1975, pp. 77-84 8 Pages.
H. Lui & J. Wang: "A New Way to Enumerate Cycles in Graph", Feb. 2006, State Key Lab of Intelligent Technology and System Department of Computer Science and Technology, Tsinghua University Beijing 100084, China, retrieved on Jan. 29, 2019 https://ieeexplore.ieee.org/document/1602189.
Written Opinion of the International Preliminary Report on Patentability Application No. PCT/EP2017/069322 Completed: Oct. 12, 2018 8 Pages.
International Search Report and Written Opinion of the International Searching Authority Application No. PCT/EP2017/069322 Completed: Nov. 15, 2017; dated Nov. 23, 2017 12 Pages.
M. Benedikt et al: "Automated Configuration for Non-Iterative Co-Simulation", Apr. 2016, retrieved on Jan. 29, 2019 https://ieeexplore.ieee.org/document/7463355.
Mao Zifang: "Modeling and Simulation of Electric Vehicle Algebraic Loop Problems Regarding Battery and Fuel Cells", Aug. 1, 2014, retrieved on Nov. 14, 2017, XP055424940 72 Pages URL:https://etda.libraries.psu.edu/files/final_submissions/9620.
Written Opinion of International Preliminary Examination Application No. PCT/EP2017/069322 Completed: Jul. 5, 2018 7 Pages.

* cited by examiner

SIGNAL FLOW-BASED COMPUTER PROGRAM WITH DIRECT FEEDTHROUGH LOOPS

TECHNICAL FIELD

The present teaching relates to a method for controlling the sequence of a signal flow-based computer program on a computing unit of a technical system in order to control, regulate, automate, or simulate a technical function of the technical system, in particular in order to develop a vehicle or a vehicle component, wherein the signal flow-based computer program consists of interconnected software components and has at least one DF loop. The teaching further relates to a method for controlling, regulating, automating or simulating a technical function of a technical system by means of such a signal flow-based computer program and a computer program product which implements this method and a computer-readable medium having such a computer program product.

BACKGROUND

In the computing unit of a technical system one or more input variables of the technical system are usually mapped to one or more output variables of the technical system by a signal flow-based computer program. The technical system can, for example, constitute a test bench which controls, regulates, automates or also simulates a technical function or a part thereof. In particular, a simulation of the technical function brings several advantages: A simulation can be repeated as often as required, and thus direct measurements on the technical system, that is to say for example on a test bench, are not necessary. In the case of a signal flow-based computer program it is known to be necessary, prior to the running of the computer program, first of all to determine the processing sequence of software components of the computer program. Subsequently, during the running of the computer program the software components of the computer program are processed according to the ascertained processing sequence. This usually takes place cyclically and at specified intervals, in some circumstances in fact in real time. The individual software components of the computer program usually map at least one input signal at a component input to at least one output signal at a component output. Naturally, software components without a component input or without a component output are also possible, but such software components are not relevant in the case of the following problem. Thus, the software components are interconnected by means of the component inputs and/or component outputs, so that overall the signal flow-based computer program, or a part thereof, results as the sum of the participating software components and the connection thereof.

Thus, the signal flow-based computer program is basically processed in three phases: creation of the individual software components of the computer program and connection to the computer program, determination of a processing sequence of the software components and, subsequently, the running of the computer program according to the ascertained processing sequence of the software components. The phases of the creation of the software components and the determination of the processing sequence thereof normally take place "offline", that is to say before the actual running of the computer program.

However, during determination of the processing sequence of the software components a problem can ensue when software components form a loop, that is to say a feedback. In the case of a loop, typically, a component output of a considered software component is fed back directly or by means of other software components to a component input of the same software component. Thus a loop constitutes a cyclical signal path. Thus, if software components which have a plurality of component inputs and component outputs are present in a loop, naturally the loop is formed only by means of a respective component input and a respective component output of the respective software components. Of course, a plurality of loops can also be present, whereby a plurality of component inputs of a software component together with a component output of this software component can form a plurality of loops. In this case the software component maps a plurality of input signals to an output signal. A plurality of loops can also be formed by means of a component input and a plurality of component outputs of this one software component. In this case the software component maps an input signal to a plurality of output signals. Mapping of a plurality of input signals to a plurality of output signals by a software component and the formation of a plurality of loops is conceivable. However, for each individual loop only the component input and the component output of the software component which form the loop in question are relevant. Naturally, the mapping of the component input to the component output can also be influenced by other parameters, for example a further component input of the same component.

A loop can comprise software components which have a so-called "non-direct feedthrough" (NDF) characteristic. This means that changes of the input signal at the relevant component input of the NDF component do not act on the output signal at the respective component output of this software component immediately and in the same cycle of the execution of the computer program. Thus an NDF loop includes at least one software component which, as part of the loop, maps an NDF input signal present at at least one component input to at least one output signal present at at least one component output. Thus the software component, together with the at least one NDF input signal and the respective output signal, is part of the NDF loop. Several methods are known for handling signal flow-based computer programs with NDF loops. The known software Simulink from The MathWorks for modelling of systems, for example, handles NDF loops in such a way that input signals which are present at an NDF input are quite simply ignored in the determination of the processing sequence of the software components. On the other hand, U.S. Pat. No. 8,849,641 B1 makes it possible to automatically determine the processing sequence of the software components of NDF loops.

In contrast to this, a DF ("direct-feedthrough") characteristic of a component input of a software component means that changes to the input signal at the relevant component input in the same cycle act on an output signal at the associated component output of this software component, which can result in a cyclical data dependence. Such a software component, which maps a DF input signal at a component input instantaneously to an output signal at a component output, is henceforth designated as a DF component. A DF loop is provided when all of the software components which span the DF loop are DF components. Only the DF input signals at the component inputs and the output signals at the component outputs of the DF components which span the DF loop are part of the DF loop. These component inputs with DF input signals act directly and in the same cycle on the output signals at the respective component output of the relevant DF component. Naturally, the DF components which have DF input signals and output signals as part of the loop can also have NDF input signals or DF input signals which are not part of the considered loop, but are part of a further DF loop, an NDF loop or even no loop. It is important for the characteristic of a DF loop that no NDF components are present as mapping of NDF input signals to output signals are present in the signal path of the DF loop.

If at least one DF loop consisting of DF components is present in the computer program, specific methods should be applied for detecting the DF components of the DF loop. For this purpose mention may be made in particular to the "depth-first search" (DFS) or "breadth-first search" (BFS) methods. These methods constitute known algorithms from graph theory. In the case of the DFS method, starting from a start node all predecessor nodes are visited. Predecessor nodes are nodes upon which the relevant node is dependent (for example due to the necessary data flow), which are therefore located in a first previous level. Searching further, starting from the first predecessor node in the first previous level, a transition is made to the predecessor node thereof (second previous level). This is repeated until there is no longer any predecessor node, or a node is reached which has already been visited once in the course of the search. In this case a cyclical dependence is regarded as given. Thus the search path which is run through contains those nodes which constitute the loop. In the DFS method in each case a predecessor node of the previous level is always, and therefore the search initially takes place "in depth", until no predecessor node exists. In the BFS method initially all predecessor nodes of the current previous level are visited (that is to say "in breadth") before subsequently moving a further step in depth.

There are also algorithms which make the detection of loops somewhat more efficient than the aforementioned methods, in which connection reference is made to D. B. Johnson (1975), "Finding all the elementary circuits of a directed graph" in Siam J. Comput, Vol. 4, Not and H. Lui and J. Wang (2006), "A new way to enumerate cycles in graph", State Key Lab of Intelligent Technology and System Department of Computer Science and Technology, Tsinghua University Beijing 100084, China.

Thus, methods for identification of DF loops are known, although the resolution of DF loops generally requires an intervention by the user. In US 2005/0060129 A1 the processing sequence of the software components is modified in order thus to resolve the DF loop. This involves loops which are produced by hierarchical models within the software components and after transformation into a flat model no longer exist—that is to say that these are not real DF loops and the solution described in US 2005/0060129 A1 is not applicable to DF loops in the conventional sense.

In M. Benedikt and F. R. Holzinger (2016), "Automated Configuration for Non-Iterative Co-Simulation", the automated configuration of a non-iterative co-simulation is described. In this case each software component is calculated within a dedicated solver. As a result each software component has its own local simulation time. The processing sequence of the software components is determined and adapted dynamically to the running time of the co-simulation. The software component of which the local simulation time is the oldest is always calculated in each case. If the local simulation time is identical (such as for example at the simulation time t=0), the software component which has the lowest number of component inputs is calculated. However, this method is not applicable if all software components run in the same computing unit and have the same simulation time.

If DF loops of a signal flow-based computer program are not processed, the processing sequence of the software components is not unambiguous because of the cyclical dependence of the DF components in the DF loop, and the computer program cannot be run. Therefore, for the execution of the signal flow-based computer program with a DF loop, the DF loop must be resolved in order be able to unambiguously determine the processing sequence of the software components, including the DF components.

SUMMARY

Therefore, one object of the present teaching is to provide a method for execution of a signal flow-based computer program which has at least one direct feedthrough loop.

This object is achieved by a method for controlling the sequence of a signal flow-based computer program on a computing unit of a technical system in order to control, regulate, automate, or simulate a technical function of the technical system, in particular in order to develop a vehicle or a vehicle component, wherein the computer program consists of interconnected software components and has at least one DF loop, comprising the following steps:

identifying the at least one DF loop and the DF components which form the at least one DF loop, each said DF component instantaneously imaging at least one DF input signal present at at least one component input onto at least one output signal present at at least one component output, whereby the at least one DF input signal and the at least one output signal are part of the at least one DF loop, determining the maximum possible change of the values of the DF input signals for each unit of time from at least one property of the respective DF input signal, activating a delay element in front of the component input where a DF input signal is present whose value has the smallest maximum possible change, and running the computer program in accordance with the connection of the software components ascertained in steps a) to c).

Furthermore, the object is achieved by a method for controlling, regulating, automating, or simulating a technical function of a technical system, in particular in order to develop a vehicle or a vehicle component by means of a signal flow-based computer program, wherein the computer program consists of interconnected software components, has at least one DF loop and is run on a computing unit of the technical system, comprising the following steps:

identifying the at least one DF loop and the DF components which form the at least one DF loop, each said DF component instantaneously imaging at least one DF input signal present at at least one component input onto at least one output signal present at at least one component output, whereby the at least one DF input signal and the at least one output signal are part of the at least one DF loop, determining the maximum possible change of the values of the DF input signals for each unit of time from at least one property of the respective DF input signal, activating a delay element in front of the component input where a DF input signal is present whose value has the smallest maximum possible change, and running the computer program in accordance with the connection of the software components ascertained in steps a) to c), in order to control, regulate, automate or simulate the technical function of the technical system.

Each DF component has at least one component input and at least one component output. On each DF component at least one DF input signal is present at at least one component input and at least one output signal is present at at least one component output of this DF component. By connection of these component inputs and component outputs the output signal of one DF component is guided to a further DF component, where it is present as a DF input signal and in turn is mapped to an output signal. This takes place until a DF loop is formed. Thus a plurality of DF components, or in each case a component input and a component output of the DF components span a DF loop. If a plurality of DF loops are present, DF components, or the component input and/or component output thereof, can also be part of a plurality of loops.

Thus, in the steps a) to c), already before commencement of the execution of the signal flow-based computer program, the software components contained in the signal flow-based computer program, in particular DF components, are created or are modified and the processing sequence of the software components together with DF components is determined.

Thus, in the execution of the signal flow-based computer program which follows in the step d), for the respective current cycle step the delay produced by the delay element constitutes a separation of the associated DF loop before the component input of the relevant DF input signal. Thus, the relevant DF loop for the current cycle step is resolved at this point and has been more or less changed to an NDF loop. Therefore, due to the insertion of delay elements at the determined point a DF loop is converted into an NDF loop. The output signal which is generated by the preceding DF component is only made available to the subsequent DF component as a DF input signal with a delay. The NDF loop produced in this case can then be handled by well-established methods. Due to the generated delay, during the course of the computer program in the current cycle step the value of the DF output signal of the preceding DF component of a previous cycle step is read in—for example in the case where the value of the preceding cycle step is delayed by one cycle step. In this case, in order to determine which component input is provided with a delay element, it is essential to determine the maximum possible change to the value of the at least one (instantaneous) DF input signal of this component input within a unit of time, for example a cycle step, from at least one characteristic of the DF input signal. The strength by which the value of a DF input signal at a DF component could change is generally designated as a maximum signal dynamics of the DF input signal, so that subsequently the designation "signal dynamics" is used for "maximum possible change to the value". If only one DF loop with a DF component, the DF output of which is fed back to the DF input of the same DF components, is present in the signal flow-based computer program, trivially, this one component input is provided with a delay element, whereupon the signal flow-based computer program no longer has a DF loop. However, if a plurality of DF components with DF input signals are present in a DF loop, the signal dynamics of the DF input signals present is determined. The component input at which a DF input signal with the lowest signal dynamics is present is provided with a delay element and, thus, the one DF loop is converted to an NDF loop. If a plurality of DF input signals with the same signal dynamics occur in the one loop, a component input which has one of these DF input signals is provided with the delay element.

The signal dynamics of the at least one DF input signal can be evaluated in each case with a penalty value, whereupon the penalty values are compared.

In principle, for solution of a DF loop the DF input signal which, due to the delay, causes the least errors at the output of the signal flow-based computer program should be delayed. In order to determine these respective errors caused by the delaying of the individual DF input signals at the output of the signal flow-based computer program, the component inputs at which the DF input signals of the DF components which form the DF loops can theoretically be interrupted individually on a test basis during the running of the signal flow-based computer program. Then the DF input signals which cause the least errors at the output could be determined. Thus, for example, the deviation of the signal at the output without delaying the DF input signals from the signal at the outlet with interruption of the relevant DF input signal would be designated as an error. Therefore it would be determined how great the error at the output could be if the DF input signal at the component input of the relevant DF component is delayed by at least one cycle step, that is to say, as mentioned, the DF loop at the relevant component input in the current cycle step is deemed to be cut. However, it is disadvantageous that with this method the signal dynamics of the DF input signals at the component inputs could only be determined during the running of the computer program. Since this information is required for determination of the processing sequence of the software components, in particular the DF components in the signal flow-based computer program, already before the actual implementation of the signal flow-based computer program, before the running of the computer program an estimation (or approximation) of the signal dynamics of the DF input signals of the DF components must take place. Then the component input at which the DF input signal with the lowest estimated signal dynamics is present is selected, and a delay element 1/z is inserted before the component input. If penalty values are used, the penalty value in this case is higher the greater the estimated signal dynamics is. In the event of a delay, a high estimated signal dynamics would result in a great error.

As the DF loop at the location of the component input with the DF input signal which has the lowest signal dynamics is provided with a delay element, this DF loop has been converted to an NDF loop. If further DF loops are still present in the computer program, they can also be processed by the method according to the present teaching, or by other methods (for example manually).

However, the method step c), that is to say the activation of the delay element before the DF input signal, of which the value has the lowest signal dynamics, can be repeated in order to convert a further DF loop to an NDF loop. Thus, the DF loops are successively divided at the location of the DF input signals with the lowest signal dynamics. This can be carried out until no DF loop is present in the computer program, whereby even arbitrarily nested DF loops can be resolved. This means that any DF loops have been resolved, i.e. to converted NDF loops, and thus all cyclical data dependencies have been eliminated. Once again, the resolution of the DF loops is dependent upon the signal dynamics of the (instantaneous) DF input signal within a cycle step. Naturally, it is also possible to resolve the further DF loops in a different manner than that just described. It should be noted that the DF input signals which formerly belonged to a DF loop which, however, has been resolved, i.e. converted to an NDF loop, and then are not part of a (further) DF loop, no longer constitute DF input signals. Thus, the signal dynamics of these former DF input signals are not relevant for further processing, or resolution of the DF loops which may still be present. If DF input signals with the same signal dynamics occur in each case in a plurality of DF loops, in a first step a component input which has one of these DF input signals with the same signal dynamics is provided with the delay element. In a further step, a further component input (of a further DF loop which is still present) which has one of these DF input signals (with the same signal dynamics) is provided with a delay element—naturally only if the DF input signal after the first step is still a DF input signal. Naturally, it would also be possible simultaneously to divide two DF loops which are independent of one another, in that in the respective DF loop in each case the component input having the DF input signal with the lowest signal dynamics within the relevant loop is provided with a delay element. The processing sequence of the computer program ultimately results from the connection of the software components and now contains only signals in NDF loops.

Thus, when penalty values are used, after the DF input signals of the DF components have been provided with penalty values the DF input signal having the lowest penalty value is determined and the respective component input is provided with a delay element, so that the relevant DF loop is divided. After determination of the next instantaneous DF input signal (which is still part of a further DF loop) having the next higher penalty value, once again the associated component input is provided with a delay element and thus the further DF loop is divided, etc.

In the method, the process step b) is advantageously carried out only once. A new determination of the signal dynamics of the instantaneous DF input signal still present is not necessary, but is also possible. However, it should be noted that due to a new determination of the signal dynamics optimization of the solution could no longer be guaranteed. However, at any time the presence of DF loops and DF components can be checked as described in the process step a). Just after the processing of a DF input signal by the method according to the present teaching it may be helpful (in particular in the case of nested DF loops) once again to identify the DF loops, DF components and DF input signals of the computer program which are still present.

Additional information relating to the relevant DF input signal is used in the determination of the signal dynamics of the at least one DF input signal. A DF input signal generally represents a physical parameter. Thus, from this, the signal dynamics of the DF input signal to be expected can be estimated in many cases. The signal dynamics of the respective DF input signal is advantageously determined by means of the physical unit (for example temperature, current intensity, distance, etc.) of the respective DF input signal. The use of a physical unit is advantageous in particular since the physical unit is static, i.e. is already known before the execution of the computer program and, moreover, is likewise used in many computer programs. In this case estimated errors or signal dynamics are advantageously stored for each physical unit (derived for example from the SI units), and in turn produce an estimated error if that input signal were to be delayed. These correlations result from the fact that certain values (such as for example temperature, distance) change slowly, whereas other values (such as for example current intensity, light intensity) change quickly. Furthermore, the signal dynamics of the respective DF input signal can be estimated by means of the data type of the respective DF input signal. This is applicable above all if no physical unit is defined for DF input signals, or if the DF input signal has no unit (for example an Enum variable). The data type of the DF input signal can be represented, for example, by Boolean, integer or float, wherein the signal dynamics of Boolean is greater than integer and float has the lowest dynamics. Furthermore, the data type bandwidth (for example 8, 16, 32, 64 bit) could be included in the estimation of the signal dynamics. In a test bench there is possibly even more information relating to the DF input signals, for example the physical range which a signal can have. A maximum rate of change can also be estimated from this signal range and can be used for calculation of the signal dynamics of the at least one DF input signal.

A mix of unit and data type of the DF input signals is advantageously used for determination of the signal dynamics of the at least one DF input signal, since in this way a more precise approximation is possible.

NDF loops are advantageously taken into consideration, and NDF input signals at an NDF component input are ignored. Thus, only the DF loops have relevance and must be processed according to the present teaching.

BRIEF DESCRIPTION OF THE DRAWINGS

The present teaching is explained in greater detail below with reference to FIGS. 1 to 3d, which show by way of example, schematically and without limitation, advantageous embodiments of the present teaching. In the drawings.

DETAILED DESCRIPTION

Figure 1:
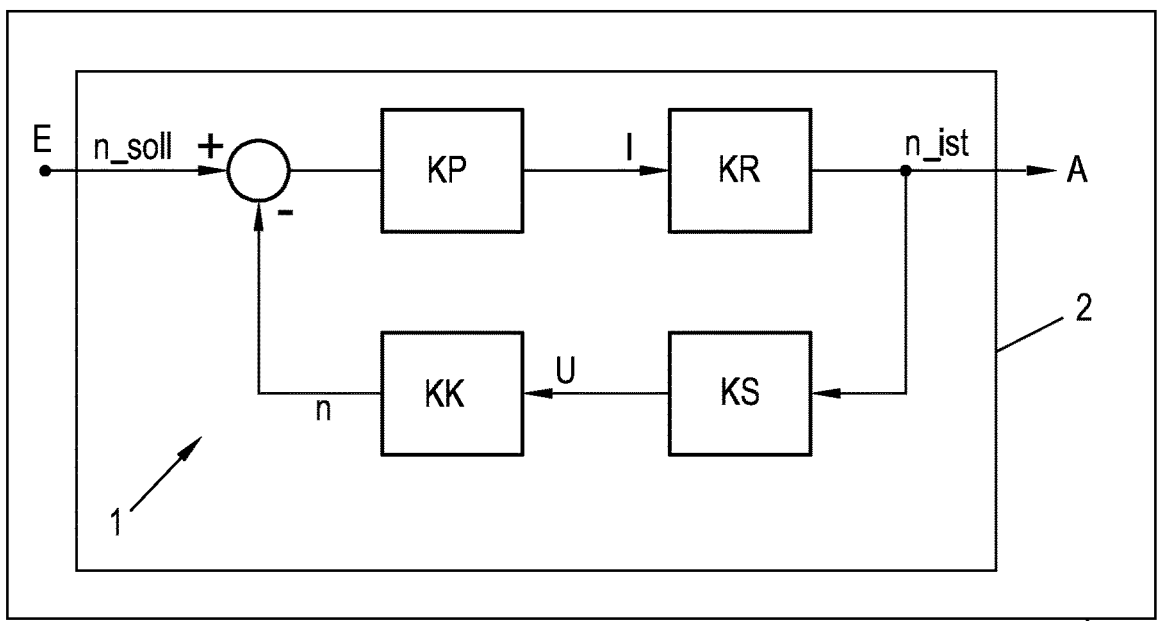
FIG. 1 shows a direct feedthrough loop by way of example.

FIG. 1 shows by way of example a technical system 3 having a computing unit 2, which runs a specific exemplary embodiment of a signal flow-based computer program 1. The technical system 3 is for example a test bench for a vehicle or a vehicle component (combustion engine, drive train, etc.) as test piece with a computing unit 2, for example part of an electronic control of the test bench on which the signal flow-based computer program 1 is run, in order to control, to regulate, to automate or to simulate a technical function of the test bench, in particular for carrying out a defined test run on the test bench with the test piece.

The computing unit 2 has an input E, by means of which a desired rotational speed n_soll is supplied to the signal flow-based computer program 1. Furthermore, the computing unit has an output A, by means of which the computer program 1 outputs an actual rotational speed n_ist. The signal flow-based computer program 1 has the software components P-regulator KP, control path KR, rotational speed sensor KS and converter component KK, which form a DF loop. Thus, in this exemplary embodiment the signal flow-based computer program 1 forms a closed control loop for regulating the control path KR. The desired rotational speed n_soll is supplied to the P-regulator KP. The P-regulator emits a current I as manipulated variable, which is made available to the control path KR as input signal. The control path KR supplies the actual rotational speed n_ist, which is present at the output A. Moreover, the component output of the control path KR is fed back by means of the rotational speed sensor KS and the converter component KK to the component input of the P-regulator KP and thus to the input E. Thus, the rotational speed sensor KS receives the actual rotational speed n_ist at the component input and outputs a voltage U which is proportional to the actual rotational speed n_ist and is present at the component input of the converter component KK. The converter component KK in turn converts the voltage U to a rotational speed n, which is fed back to the input E and thus to the component input of the P-regulator KP. Thus the desired rotational speed n_soll and the rotational speed n are present at the P-regulator KP. Since none of the components KP, KR, KS, KK has a delay element 1/z (in time-discrete notation after z-transformation), a DF loop is present.

Figure 2:
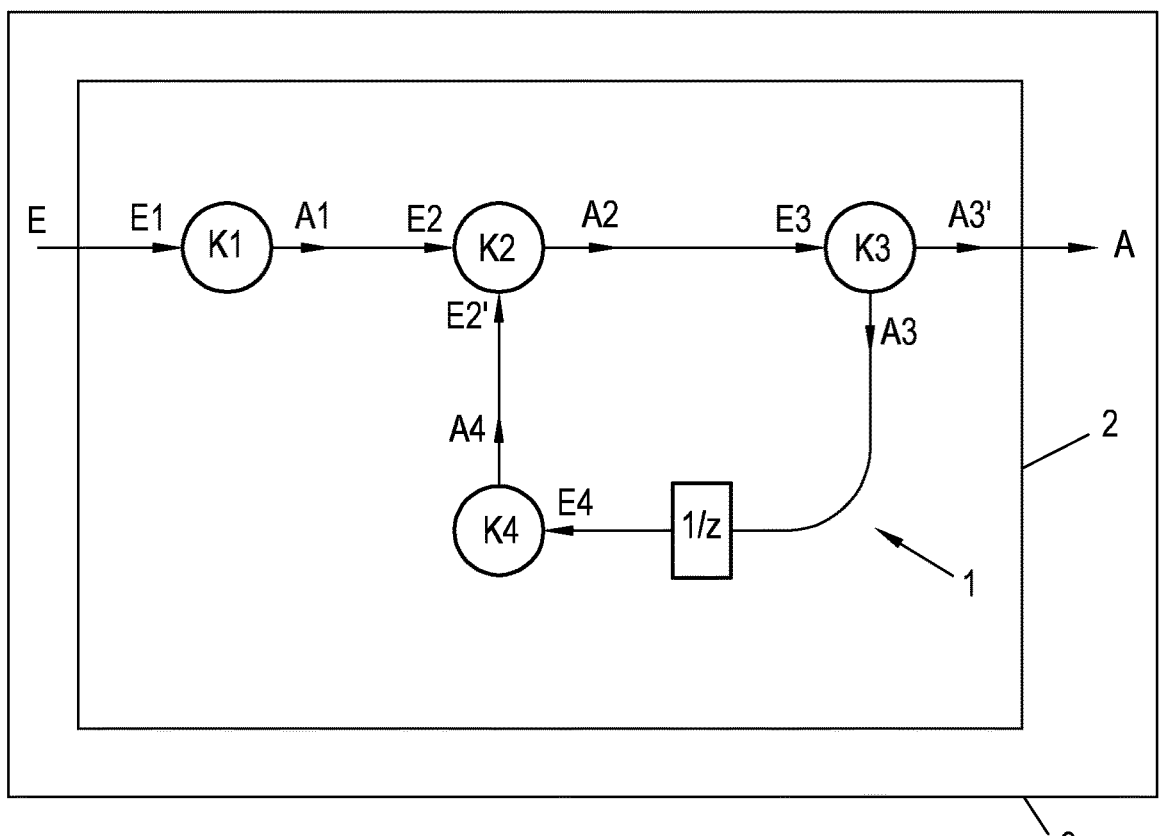
FIG. 2 shows a signal flow-based computer program having a non-direct feedthrough loop.

FIG. 2 depicts a technical system 3 having a computing unit 2, on which a more abstract, generalized signal flow-based computer program 1 is run. There several output signals A1, A2, A3, A4 at the component outputs of the software components K1, K2, K3, K4 are in each case connected to input signals E2, E2', E3, E4 at the component inputs of the software components K1, K2, K3, K4 via the signal paths depicted as arrows. Thus, depending upon the connection, an output signal A1, A2, A3, A3', A4 of a software component K1, K2, K3, K4 can be an input signal E1, E2, E2', E3, E4 of another software component K1, K2, K3, K4. A software component K1, K2, K3, K4 forms a part of the signal flow-based computer program 1 and all software components K1, K2, K3, K4 together and the interconnection thereof via the signal paths form the signal flow-based computer program 1. A software component K1, K2, K3, K4 can be any mathematical, analytical, empirical or physical model in any encoding or can be any software code and maps the at least one component input to the associated at least one component output of the software component K1, K2, K3, K4. During the course of the signal flow-based computer program 1, in a cycle step of the execution of each software component K1, K2, K3, K4 an input signal E1, E3, E4, or also two or more input signals E2, E2' is or are mapped to an output signal A1, A2, A4, or also to a plurality of output signals A3, A3'. As mentioned, the number of input signals E1, E2, E2', E3, E4 and output signals A1, A2, A3, A3', A4 per software component K1, K2, K3, K4 can be arbitrary. By means of the input E of the computing unit 2 the signal flow-based computer program 1 receives the input signal E1 at the first software component K1, and by means of a component output of the last software component K3 it outputs an output signal A3' at the output A of the computing unit 2. The component output of the software component K1 is connected to the component input of the software component K2, so that the software component K2 receives an output signal A1 from the software component K1 as input signal E2. The component output of the software component K2 is further connected to the input of the software component K3, so that the software component K3 receives an output signal A2 as input signal E3. As can be seen, by means of the software component K4 an NDF loop is formed as feedback between the components K3 and K2, which is indicated by the delay symbol 1/z. Thus, an output signal A3 of the software component K3 is delayed by a cycle step t of the execution of the signal flow-based computer program 1. Thus, it is not the output signal A3 of the software component K3 in the current cycle step t but the signal from the preceding cycle step t−1 which serves as input signal E4 of the software component K4, so that the mapping of the input signal E4 to the output signal A4 is delayed by the software component K4. Thus, the mapping is based on the output signal A3 of the software component K3 from the preceding cycle t−1. This is the characteristic of an NDF loop. The processing sequence of the input signals E1, E2, E2', E3, E4 and output signals A1, A2, A3, A3', A4 of the software components K1, K2, K3, K4 according to the pattern of output signal at the time t A(t)=mapping by software components of the input signal at the time t K{E(t)} would therefore be:

$A1(t)=K1\{E1(t)\}$
$E2(t)=A1(t)$
$A2(t)=K2\{[E2(t), E2'(t)]\}$
$E3(t)=A2(t)$
$E2'(t)=A4(t)$
$A3(t)=K3'\{E3(t)\}$
$E4(t)=A3(t-1)$
$A4(t)=K4\{E4(t)\}$
$A=K3'\{E3(t)\}$

The valid sequential processing sequence of the software components K1, K2, K3, K4 would therefore be K1, 1/z, K4, K2, K3 or alternatively also 1/z, K4, K1, K2, K3. In this case it is merely important that the delay element 1/z is executed before the software component K4 and that, furthermore, the software component K1 and the software component K4 are executed before the software component K2. Trivially, the software component K3 is executed last in this example.

On the other hand, if the software component K4 is a DF component, then the output signal A3 of the software component K3 would not be delayed by the delay element 1/z. Thus, in the same cycle step t the input signal E4 corresponding to the output signal A3 of the software component K3 would be present at the software component K4. However, the output signal A2 of the software component K2 which corresponds to the input signal E3 of the software component K3 is required in order to determine the output signal A3 of the software component K3, which leads to a cyclical dependence and whereby a DF loop is present. Thus, the software components K2, K3 and K4 would be DF components since, as part of a DF loop, the DF input signals E2', E3 and E4 would be present at the component inputs thereof and the DF outputs A2, A3, A4 would be present at the component outputs. It will be observed that the component input having the input signal E2 is not part of the DF loop, since no DF loop spans it.

Such a DF loop is divided according to the present teaching, wherein the maximum possible change per unit of time of the values of the DF input signals of the DF components (which form the loop) is determined from at least one property of the respective DF input signal. A delay element 1/z is arranged before the component input at which the at least one DF input signal is present, the value of said input signal having the smallest maximum possible change per unit of time. Thus, the DF loop is converted to an NDF loop.

Figure 3A:
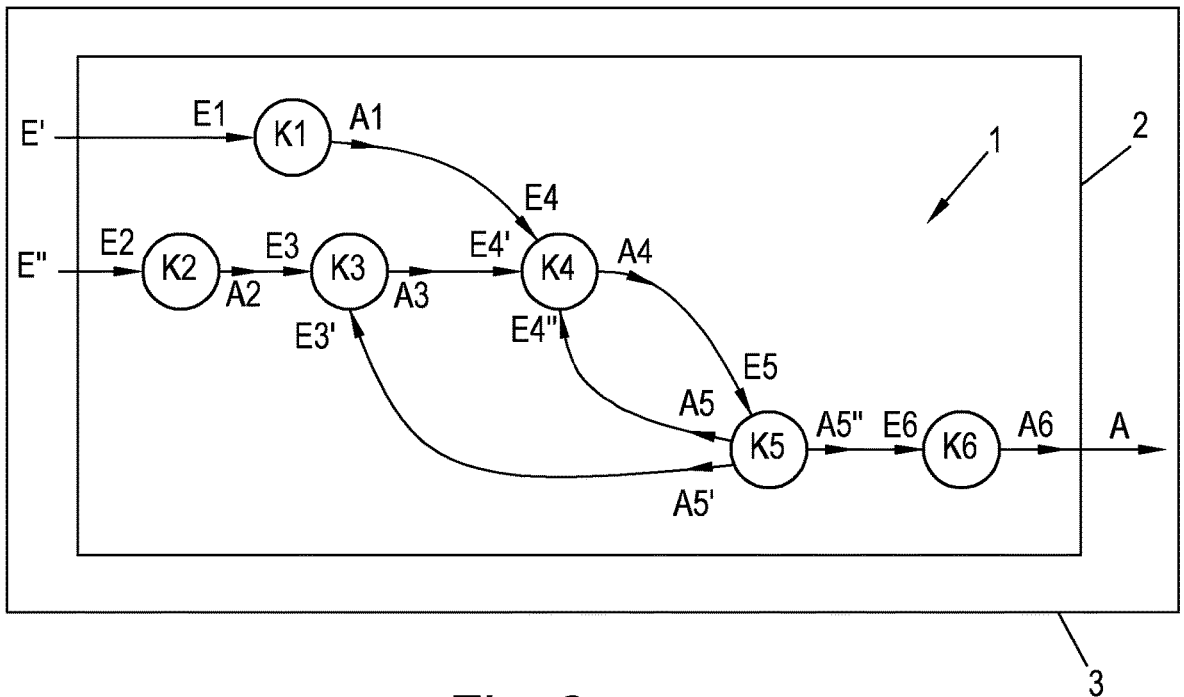
FIG. 3a shows a signal flow-based computer program with two nested direct feedthrough loops.

However, if a plurality of DF loops occurs, in general a plurality of signal paths must be delayed at the suitable points. FIG. 3a shows a signal flow-based computer program 1 run on a computing unit 2 and having the software components K1, K2, K3, K4, K5, K6, two nested DF loops being formed. The inputs E', E'' of the computer program 1 are in each case connected to the component inputs of the software components K1, K2 which thus receive the input signals E1, E2. The component outputs of the software components K1, K2 are connected to the component inputs of the software components K4, K3 which thus receive the output signals A1 and A2 as input signals E3 and E4. The component output of the software component K3 is in turn connected to the component input of the software component K4, so that the software component K4 receives the output signal A3 from the software component K3 as further input signal E4'. The component output of the software component K4 is connected to the component input of the software component K5, so that it receives the output signal A4 from the software component K4 as input signal E5. By means of an instantaneous feedback the component outputs of the software components K5, are in turn connected to further inputs of the software components K3, K4, so that they receive the output signals A5, A5' of the software component K5 as further input signals E3', E4". Thus, two DF loops A and B are formed by these instantaneous feedbacks. The DF loop A is formed by the DF components K3, K4 and K5 with the DF input signals E3', E4' and E5. The DF loop B is formed by the DF components K4 and K5 with the DF input signals E5 and E4". Thus, the DF input signal E3', the output signal A3, the DF input signal E4', the output signal A4, the DF input signal E4", the DF input signal E5, the output signal A5 and the output signal A5' grip span two DF loops, and therefore are part of the two DF loops. The input signals E3 and E4, for example, do not form any DF loop, and thus are not part of the DF loop, although they are part of the DF components K3 and K4. Naturally, input signals which are not part of the DF loop in this sense can influence output signals of a DF component, but are not significant for the determination of the signal dynamics or separation of DF loops according to the present teaching. Moreover, a component output of the software component K5 is connected to the component input of the software component K6, so that the software component K6 receives the output signal A5" from the software component K5 as input signal E6. Furthermore, the component output of the software component K6 is connected to the output A of the computing unit 2.

Figure 3B:
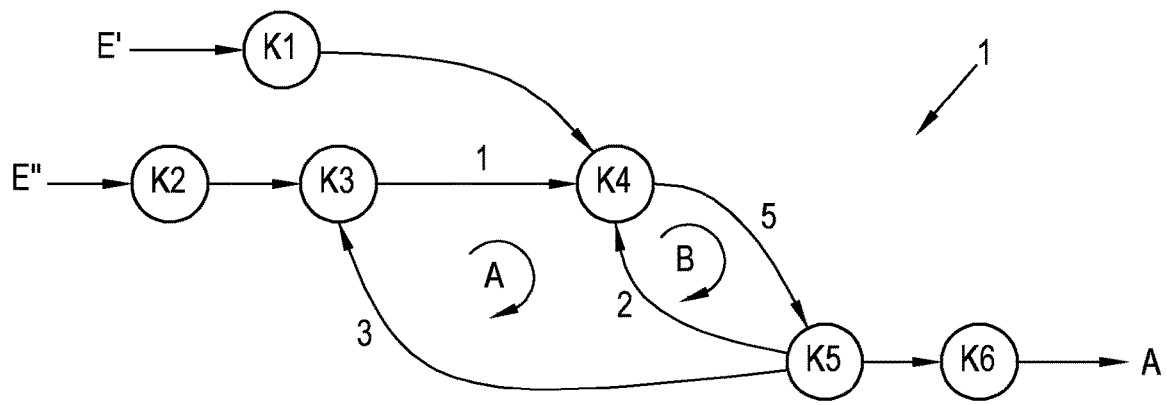
FIG. 3b shows the signal flow-based computer program, the direct feedthrough loops of which are provided with penalty values.

In order now to determine which of the signal paths of the DF loops A and B should be (first) divided, according to the present teaching the values of the DF input signals E3', E4', E5, E4" of the DF components K3, K4, K5 of the DF loops A and B are examined for signal dynamics, i.e. for the greatest possible change per unit of time of the value of the DF input signal, in this case within a cycle step t, and are evaluated with a penalty. A low penalty value signifies, for example, a low signal dynamics. The values for the penalty are produced as shown in FIG. 3b in the signal paths, wherein the DF input signal E4' at the component input of the DF component K4 obviously has a low signal dynamics by comparison with the DF input signal E4" at a component input of the DF component K4, the DF input signal E3' of the component input of the DF component K3, as well as the DF input signal E5 of the component input of the DF component K5, since the DF input signal E4' has the penalty value of one (by comparison with penalty values of two, three or five).

The penalty values can result, for example, from the data type of the values of the DF input signal, for example with the definition of the penalty values: Boolean: 9, Byte: 7, Integer: 5, Float: 1. The background for this is that the value of a float value per unit of time can change significantly less than the value of a Boolean value, whereby the possible signal dynamics of a float value is smaller. The penalty values can also be determined according to the physical unit of the DF input signals, for example with the definition of the penalty values: Temperature: 1, mass flow: 3, revolutions per minute: 5, pressure 7. In this case a physical interpretation of the DF input signals is used. In a technical system will be able to change significantly more slowly than the pressure, so that a lower signal dynamics can be expected. It is also possible to combine different criteria for determination of the penalty value. Examples are: first of all, the determination of the physical unit and then, within a physical unit, a further sub-division according to the data type.

Thus, the signal path with the lowest penalty value of one, that is to say the DF input signal E4', is divided here between the DF component K3 and K4. This means that the output signal A3 of the DF component K4 is available, delayed by one cycle step t, as input signal E4'. Thus the DF input signal E4' becomes an NDF input signal, so that the former DF loop A is now an NDF loop. However, the DF input signal E5 remains a DF input signal, which furthermore forms the DF loop B.

Figure 3C:
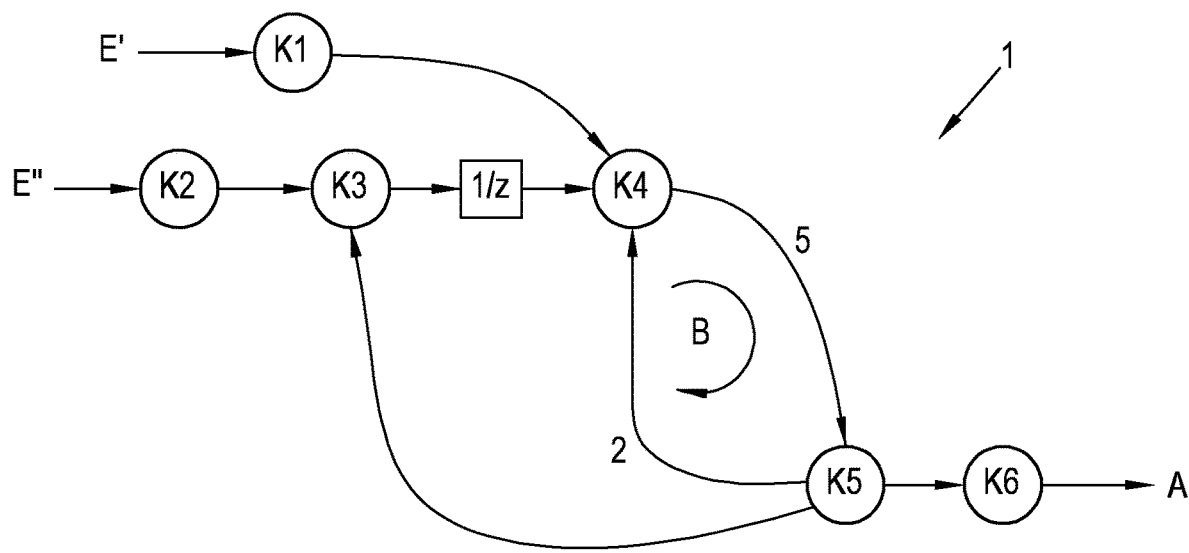
FIG. 3c shows the signal flow-based computer program with a direct feedthrough loop converted to a non-direct feedthrough loop.

The DF loop B can now be processed in a further step, preferably likewise according to the process step 1c). Therefore, in the DF loop B which is still present the signal path having the lowest penalty value is determined—that is to say in FIG. 3c the penalty value of two at the signal path from the output signal A5 to the DF input signal E4" by comparison with the higher penalty value of five at the signal path from the DF output signal A4 to the DF input signal E5. Accordingly the output signal A5 is delayed by one cycle step t and is available, delayed by the cycle step t, to the DF component K4 as input signal E4". Therefore, the former DF loop B now likewise constitutes an NDF loop. It will be noted that the input signal E4 of the DF component K4 does not have to be divided, since it is not linked to the DF loop or is not part of the DF loop. Therefore, the signal dynamics of the input signal E4 also does not have to be determined.

It should be noted that the separation of a DF loop does not mean that the DF components which formed the DF loop are automatically NDF components with regard to all component inputs and component outputs, as can also be seen in FIG. 3b in conjunction with FIG. 3a with reference to the DF component K4 with the DF input signal E4, E4' and E4". This would only be the case if these DF components form no further DF loops, that is to say no further component inputs with DF input signals, which are part of another DF loop. If a DF loop has been divided, only the DF input signals which formed the DF loop become NDF input signals—further DF input signals which form another DF loop remain DF input signals, since this other DF loop persists (until a potential further resolution thereof).

Figure 3D:
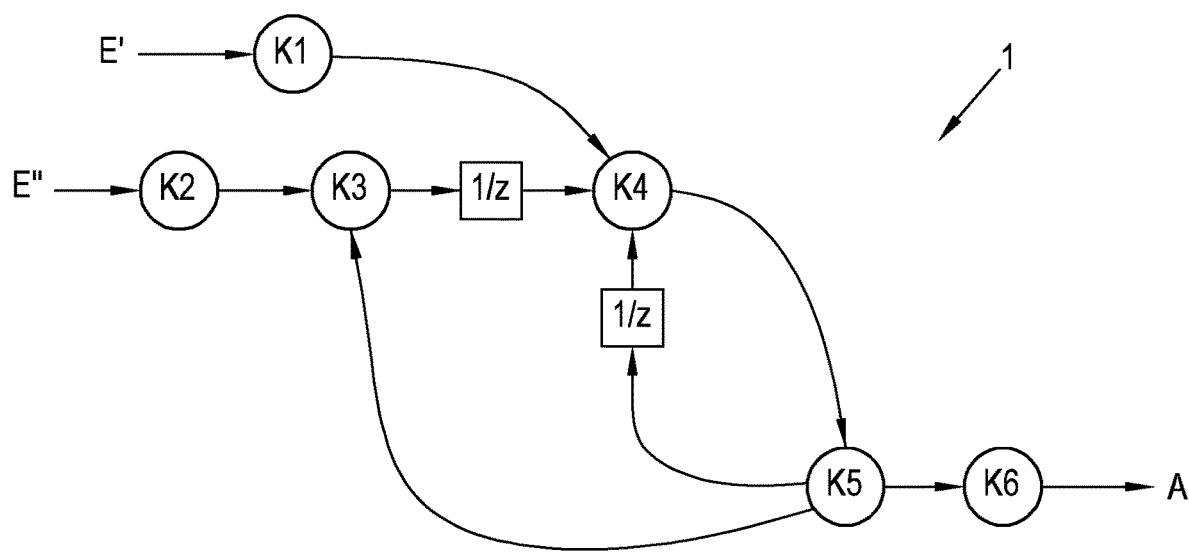
FIG. 3d shows the signal flow-based computer program with both direct feedthrough loops converted to a non-direct feedthrough loop.

According to FIG. 3d, after separating the signal paths there are no longer any DF loops. If further DF loops were present, next the signal paths with the next higher dynamics would be divided by insertion of a delay element 1/z. In this way the cyclical dependencies are resolved and the signal flow-based computer program can be executed according to the processing sequence fixed thereby. In this case it is self-evident that the past values of the delayed input signals must be stored temporarily. The method can be used for resolving all DF loops of the signal flow-based computer program 1. In this connection the signal dynamics of the at least one DF input signal E3', E4', E4", E5 is determined and then before the component input at which the DF input signal E3', E4', E4", E5 having the lowest signal dynamics is present, a delay element 1/z is provided and thus delayed by at least one cycle step t until there is no longer any DF loop present in the signal flow-based computer program 1.

For the signal flow-based computer program 1 it is important that all DF loops are resolved, in order to fix the processing sequence. However, for the present teaching it is sufficient if at least one of these DF loops is resolved by the method described above. The other DF loops can also be resolved by other methods. Naturally, however, all DF loops are preferably resolved by the method according to the present teaching.

Likewise, it is not always absolutely necessary to delay by one cycle step t (1/z), but another delay can also be selected. Thus, in general, a delay element $1/z^N$ is inserted in order to resolve a DF loop.

The invention claimed is:

1. A method for developing a vehicle or a vehicle component by means of a signal flow-based computer program, wherein the computer program includes interconnected software components, has at least one Direct Feedthrough (DFD) loop, and is run on a computing unit of a technical system, comprising the following:
   a) identifying the at least one DF loop and DF components, which form the at least one DF loop, each said DF component instantaneously mapping at least one DF input signal present at least one component input onto at least one output signal present at least one component output, whereby the at least one DF input signal and the at least one output signal are part of the at least one DF loop,
   b) determining a maximum possible change of values of DF input signals for each unit of time from at least one property of the respective DF input signal, wherein the maximum possible change per time unit is called signal dynamic and wherein the maximum possible change to the signal dynamics is a strength by which the value of the respective DF input signal may change is a maximum signal dynamic of the respective DF input signal and also represents the maximum possible change per time unit,
   c) activating a delay element in front of a component input where a DF input signal is present whose value has a smallest maximum possible change,
   d) running the computer program in accordance with a connection of the software components ascertained in steps a) to c), in order to control, regulate, automate or simulate technical function of the technical system.

2. The method according to claim 1, wherein c) is repeated until no DF loop is present in the computer program.

3. The method according to claim 2, wherein, before each repetition of c), a) is also repeated.

4. The method according to claim 1, wherein a possible change per unit of time of a value of the at least one DF input signal is evaluated each with a penalty value and the penalty values are compared.

5. The method according to claim 1, wherein a possible change per unit of time of a value of the DF input signals is determined each with reference to a physical unit of the respective DF input signals.

6. The method according to claim 1, wherein a possible change per unit of time of a value of the DF input signals is determined each with reference to a data type of the respective DF input signals.

7. A non-transitory computer-readable medium, on which a computer program product according to claim 1 is stored.

8. A technical system controlling a computer program having a Direct Feedthrough (DF) loop, comprising:
   a computing unit executing the computer program to perform the following:
      identifying the DF loop and DF components that form the DF loop, each DF component instantaneously mapping a DF input signal present at a component input to an output signal present at a component output, the DF input signal and the output signal part of the DF loop;
      determining a maximum change of values of DF input signals for each unit of time from a property of the respective DF input signal;
      activating a delay element in front of a component input where a DF input signal is present whose value has a smallest maximum change;
   wherein a sequence of the computer program is controlled in accordance with the identifying, determining, and activating in order to control, regulate, automate, or simulate a technical function of the technical system.

9. A vehicle test bench, comprising:
   the system of claim 8;
   a vehicle component;
   wherein the computer program is controlled to simulate a test run of the vehicle component on the test bench.

10. The test bench of claim 9, wherein the vehicle component comprises a vehicle drive train.

11. The test bench of claim 9, wherein the determining is repeated until no DF loop is present in the computer program, and before each repetition of determining the identifying is also repeated.

12. The test bench of claim 9, wherein a possible change per unit of time of a value of the DF input signal is evaluated for the controlling the computer program.

13. The test bench of claim 12, wherein the DF input signal is evaluated with a penalty value and penalty values are compared.

* * * * *